J. R. BLAKESLEE 1,469,174

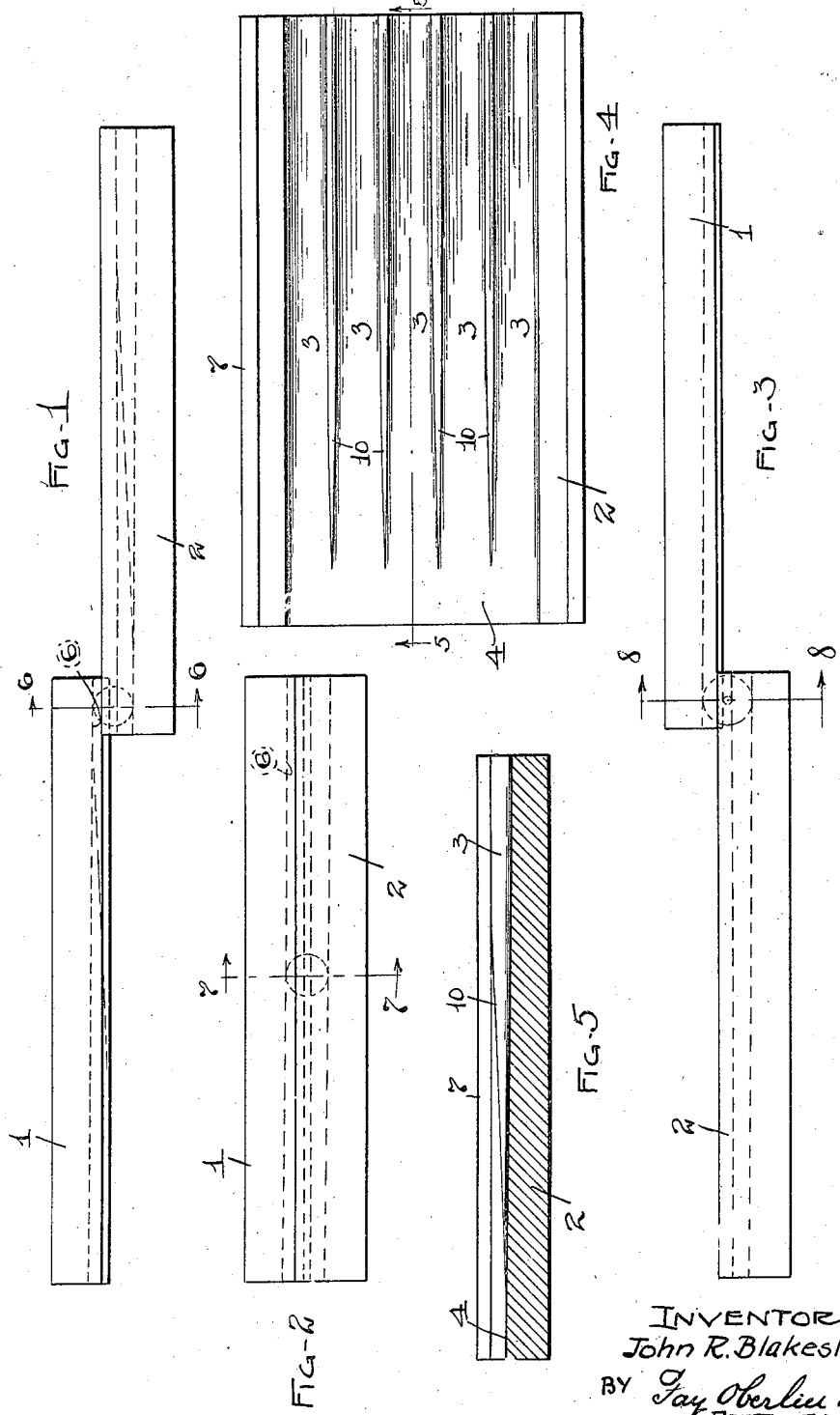
Sept. 25, 1923.
J. R. BLAKESLEE
METHOD OF MAKING SPHERICAL ARTICLES
Filed Nov. 25, 1916
1,469,174
2 Sheets-Sheet 1
INVENTOR
John R. Blakeslee
BY Jay Oberlin & Jay
ATTORNEYS Sept. 25, 1923.

METHOD OF MAKING SPHERICAL ARTICLES

Filed Nov. 25, 1916    2 Sheets-Sheet 2

INVENTOR
John R. Blakeslee

BY Fay, Oberlin & Fay
ATTORNEYS

Patented Sept. 25, 1923.

1,469,174

UNITED STATES PATENT OFFICE.

JOHN R. BLAKESLEE, OF CLEVELAND, OHIO.

METHOD OF MAKING SPHERICAL ARTICLES.

Application filed November 25, 1916. Serial No. 133,349.

*To all whom it may concern:*

Be it known that I, JOHN R. BLAKESLEE, a citizen of the United States, and a resident of Cleveland, county of Cuyahoga, and State of Ohio, have invented a new and useful Improvement in Method of Making Spherical Articles, of which the following is a specification, the principle of the invention being herein explained and the best mode in which I have contemplated applying that principle, so as to distinguish it from other inventions.

The present invention, relating as indicated to spherical articles and the method for making the same, has more particular regard to ball bearings and their manufacture as well as to the manufacture of other articles having a spherical or approximately spherical part, such for example, as connecting rods and similar articles. One object of the invention is to provide a method of making such articles which shall be less expensive than the present methods and which shall produce articles of the same or greater strength and wearing qualities. To the accomplishment of the foregoing and related ends, said invention, then, consists of the mode hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

Figure 6:
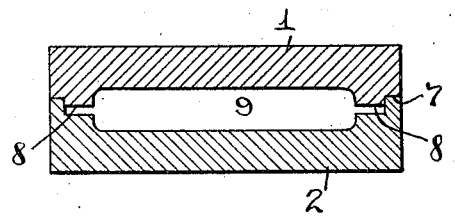
Figure 7:
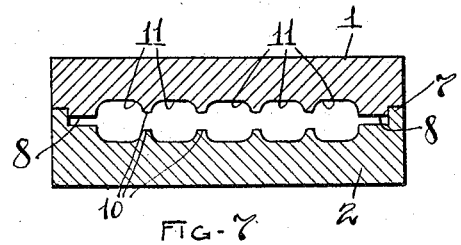
Figure 8:
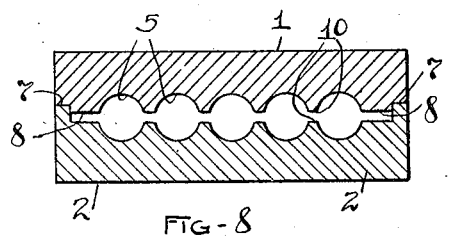
Figure 9:
Figure 10:
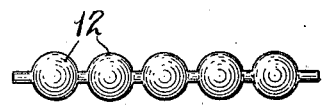
Figure 11:

In said annexed drawings:

Figure 1 is a side elevation showing one approved means for carrying out the present invention in the form of two co-operative plates in their initial or starting position; Figure 2 is a similar view, but showing these plates at the middle of their stroke or movement; Figure 3 is a similar view showing the plates at the close of the forming operation; Figure 4 is a plan view of the plates shown at the right in Figure 1; Figure 5 is a section on the line 5—5 in Figure 4; Figure 6 is a section on the line 6—6, Figure 1; Figure 7 is a section on the line 7—7 in Figure 2; Figure 8 is a section on the line 8—8 in Figure 3; Figure 9 is a side elevation of the bar or billet which is to be formed; Figure 10 is a side elevation of the product after leaving the rolls, and Figure 11 is a side elevation of a connecting rod produced by the present method.

In Figure 1 there are shown two co-operative plates 1 and 2. The construction of these two plates, which are adapted to the formation of spherical objects and similar articles, such as are shown in Figures 10 and 11, is best shown in Figures 4 and 5, from which it will be seen that each plate is provided with a plurality of spaced parallel and gradually deepening semi-spherical grooves 3. In will be understood that these plates are constructed to form the articles of Figure 10 and but slight modifications will be necessary to adapt them to the formation of other articles. At its left end the plate 2 is flat, as at 4, and the grooves 3 begin a short distance from this edge and gradually deepen as they approach the right end of the plate, where they are substantially semi-spherical in cross section, as shown in Figure 8.

Co-operating with the roll 2 is an upper plate 1, which is provided with an equal number of similarly arranged, and similarly inclined grooves 5, and is also provided with a flat portion 6 at its right end. The lower plate is provided with two lateral flanges or guide rails 7, within which are received depending portions 8 on the upper plate 1 which serves to maintain these two plates in proper alignment during their operation. The upper plate 1 both rests upon and is guided by the upwardly extending flanges 7 of the plate 2, as may be seen in Figures 6, 7 and 8. The initial position of the plates is shown in Figure 1 and in such position a cylindrical bar or billet 9 is placed between the parallel flat portions 4 and 6 on the plates 2 and 1 respectively. The plate 1 is then moved across the roll 2, being maintained in parallelism therewith during such movement by means of the guides 7. The billet 9 is thus forced into the gradually deepening grooves 3 and 5 on the two plates and the walls 10 of such recesses serve to force the material in the bar laterally and to thus produce a series of enlargements corresponding to the openings 11 between the plates as shown in Fig. 7. When the plate 1 is directly above the plate 2, as shown in Figure 2 the form of the bar is illustrated by the opening between the plates as shown in Figure 7 and at this time it will be seen to have been divided into a series of roughly spherical portions 11. It will be obvious if other shapes than spherical are desired in the finished article the grooves or recesses in the plates can be formed accordingly and various other shapes can thus be produced.

As the movement of the plate 1 is continued the formation of the spherical objects continues until when the plate 1 has been moved into the position shown in Figure 3 with respect to the plate 2, a series of perfectly formed but connected balls 12 are produced, as shown in Figure 10. The next step in my process involves the severing of the connections between the spherical articles 12 as shown in Figure 10, and these articles may then be finished to exact size.

The billet or bar 9 will of course be heated to a suitable temperature before being rolled and this temperature will of course vary under different conditions and can readily be determined by anyone skilled in the rolling art. It has been found that balls for ball bearings produced in this way are very much cheaper to manufacture than by the present method of forging them individually and then grinding these forgings.

I have not shown any of the operating mechanism for the plates 1 and 2, as obviously any suitable means may be employed for this purpose. Similarly I have not shown all of the articles that can be produced by the present method, although in Figure 11 I have illustrated roughly a connecting rod, which has been rolled in this way, and of course other articles having spherical or even other shaped parts can be produced in this way at a considerable saving in expense over their production by drop forging or other methods.

Other forms may be employed embodying the features of my invention instead of the one here explained, change being made in the form of construction, provided the elements stated by the following claims or the equivalent of such stated elements be employed, whether produced by my preferred method or by others embodying steps equivalent to those stated in the following claims.

I therefore particularly point out and distinctly claim as my invention:—

1. In a method of making spherical objects, the step which consists in rolling a billet transversely to form spherical portions and to force the metal of said billet connecting said portions into such portions while maintaining substantially the original diameter of the billet.

2. In a method of making spherical objects, the steps which consist in rolling a billet transversely, applying equal pressures thereto at spaced transverse planes and along diverging transverse lines, and gradually increasing such pressures to force the metal of said billet into spheroidal portions connected by intermediate cylindrical portions, the excess metal between the spheroids being forced into the spheroids themselves while maintaining substantially the original diameter of the billet.

Signed by me, this 20th day of November, 1916.

JOHN R. BLAKESLEE.